(12) United States Patent
Ogiso et al.

(10) Patent No.: US 6,546,154 B2
(45) Date of Patent: Apr. 8, 2003

(54) IMAGE DETECTION METHOD AND LENGTH MEASUREMENT APPARATUS

(75) Inventors: Yoshiaki Ogiso, Tokyo (JP); Jun Matsumoto, Tokyo (JP)

(73) Assignee: Advantest Corporation (JP)

( * ) Notice: Subject to any disclaimer, the term of this patent is extended or adjusted under 35 U.S.C. 154(b) by 0 days.

(21) Appl. No.: 10/073,704

(22) Filed: Feb. 11, 2002

(65) Prior Publication Data

US 2002/0186896 A1 Dec. 12, 2002

Related U.S. Application Data

(63) Continuation of application No. PCT/JP01/04873, filed on Jun. 8, 2001.

(30) Foreign Application Priority Data

Jun. 12, 2000 (JP) .......................................... 2000-175079

(51) Int. Cl.⁷ ................................................. G06K 9/36
(52) U.S. Cl. ....................................... 382/287; 382/195
(58) Field of Search ................................ 382/286, 287, 382/151, 183, 195, 201, 209

(56) References Cited

U.S. PATENT DOCUMENTS 5,940,544 A * 8/1999 Nako .......................... 382/293
6,259,826 B1 * 7/2001 Pollard et al. .............. 382/284

FOREIGN PATENT DOCUMENTS

| JP | 60-169986 A | 9/1985 |
|----|-------------|--------|
| JP | 5-189570 A  | 7/1993 |
| JP | 9-54827 A   | 2/1997 |
| JP | 10-178634 A | 6/1998 |

OTHER PUBLICATIONS

PCT International Search Report dated Sep. 4, 2001.

* cited by examiner

*Primary Examiner*—Yon J. Couso
(74) *Attorney, Agent, or Firm*—Rosenthal&Osha L.L.P.

(57) ABSTRACT

An image detection method for detecting a target image from an image of an object having a band-like pattern extending along a predetermined direction, the target image containing at least part of the band-like pattern, the method includes: storing at least part of the image of the object as image data; detecting a first partial image from the stored image data based on a first template containing a first band-like template pattern that extends along the predetermined direction, the first partial image being an image of a first partial region containing substantially the same pattern as the first band-like template pattern; and detecting a second partial image, as the target image, in a region extending from the first partial region along the predetermined direction based on the target image containing the at least part of the band-like pattern, the second partial image being an image of a second partial region containing substantially the same pattern as that of the target image.

10 Claims, 7 Drawing Sheets

TARGET IMAGE

TARGET IMAGE

IMAGE DETECTION METHOD AND LENGTH MEASUREMENT APPARATUS

This is a continuation application of PCT/JP01/04873 filed on Jun. 8, 2001, further of a Japanese patent application, 2000-175079 filed on Jun. 12, 2000, the contents of which are incorporated herein by reference.

BACKGROUND OF THE INVENTION

1. Field of the Invention

The present invention relates to an image detection method for detecting a predetermined part from an image of an object and a length measurement apparatus for measuring a length of the detected part. More particularly, the present invention relates to the image detection method and the length measurement apparatus in which image detection is realized by performing a plurality of processes.

2. Description of the Related Art

According to a conventional image detection method for a desired partial image from an image of an object, data of the image of the object is first obtained, and the obtained image data of the object is then scanned entirely by using a template containing the same pattern as a pattern to be contained in the partial image, thereby detecting the partial image. The conventional image detection method is described referring to FIG. 1.

Figure 1:
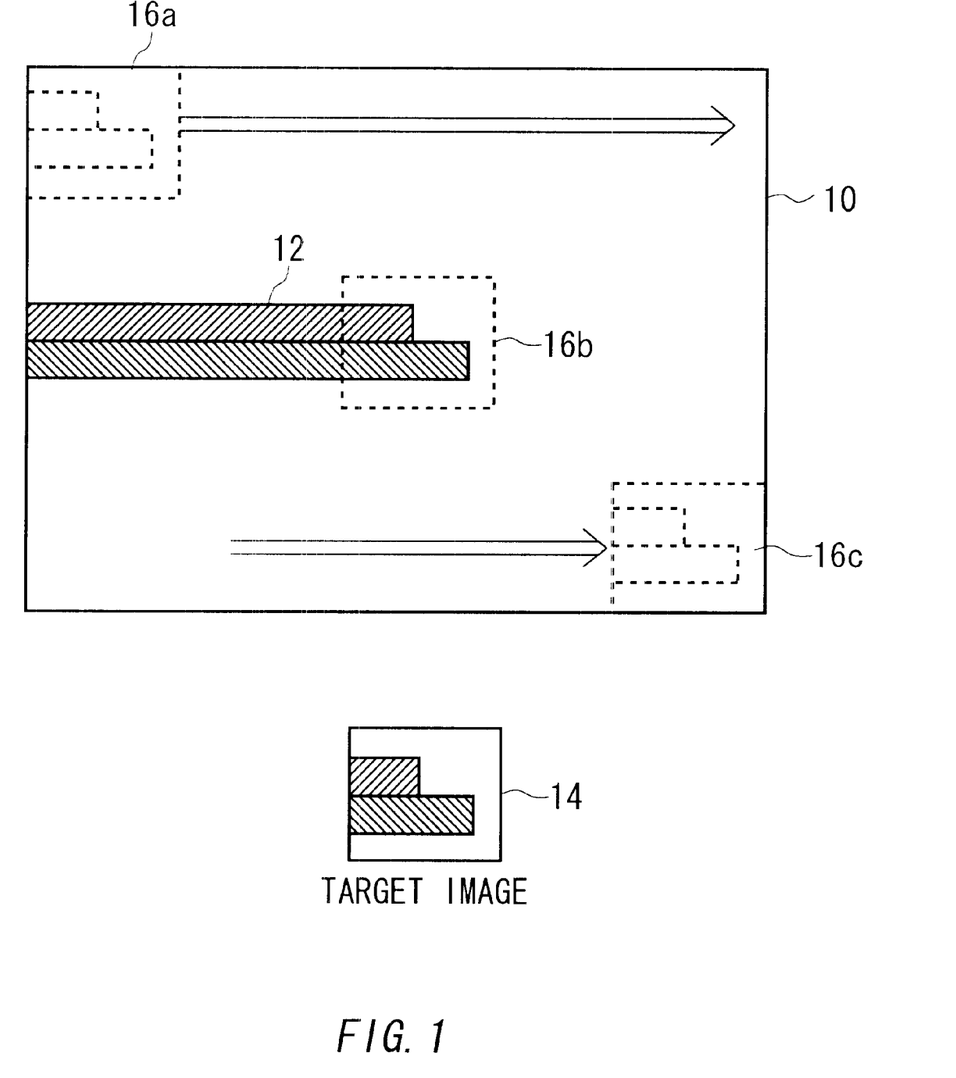
FIG. 1 illustrates a conventional image detection method.

FIG. 1 illustrates the conventional image detection method. In this example, a case of detecting a partial image that is substantially the same as a target image 14 from an image 10 of a part of an object is described. First, a partial image at a position 16a is compared to the target image 14 so as to obtain a correlation value between the partial image at the position 16a and the target image 14. Then, a partial image at a position shifted from the position 16a by a very small distance is compared to the target image 16 so as to obtain a correlation value with the target image 14. In this manner, the image 10 is scanned by shifting the position at which the comparison with the target image 14 is performed from an upper-left corner to a lower-right corner until a position 16c, thereby obtaining correlation values with the target image 14 for all the positions in the image 10. From the obtained correlation values, a position at which the maximum correlation value is obtained is then detected. In the example shown in FIG. 1, the maximum correlation value is obtained in a position 16b, and thus the partial image substantially the same as the target image is detected. This method is also used in a conventional length measurement apparatus that can measure a length of a part in order to detect the part to be measured.

The conventional image detection method and the conventional length measurement apparatus described above, however, have the following disadvantage. According to the above-described image detection method, the image detection is not efficient since the image data is entirely scanned for detecting a desired partial image, and therefore it takes much time to detect the desired partial image.

SUMMARY OF THE INVENTION

Therefore, it is an object of the present invention to provide an image detection method and a length measurement apparatus, which are capable of overcoming the above drawbacks accompanying the conventional art. The above and other objects can be achieved by combinations described in the independent claims. The dependent claims define further advantageous and exemplary combinations of the present invention.

According to the first aspect of the present invention, an image detection method for detecting a target image from an image of an object having a band-like pattern extending along a predetermined direction, the target image containing at least part of the band-like pattern, the method comprises: storing at least part of the image of the object as image data; detecting a first partial image from the stored image data based on a first template containing a first band-like template pattern that extends along the predetermined direction, the first partial image being an image of a first partial region containing substantially the same pattern as the first band-like template pattern; and detecting a second partial image, as the target image, in a region that extends from the first partial region along the predetermined direction based on the target image containing the at least part of the band-like pattern of the object, the second partial image being an image of a second partial region containing substantially the same pattern as that contained in the target image.

A region for which the image data is stored may have at least first and second sides crossing each other, the second side being substantially parallel to the predetermined direction, the detection of the first partial image is performed by scanning a first scanning region that is a part of the region for which the image data is stored, along the first side, and the detection of the second partial image is performed by scanning, along the second side, a second scanning region that extends from the first partial region along the predetermined direction.

The first and second scanning regions may cross substantially at right angles.

The band-like pattern of the object may reach an end of the region for which the image data is stored, the end including the first side. The first scanning region for which the scanning for the detection of the first partial image is performed may include the end.

The length of the first band-like template pattern in a direction along the first side may be substantially equal to the length of the pattern contained in the target image in the direction along the first side.

The length of a side of the first scanning region, that is substantially perpendicular to the first side, may be equal to the length of a side of the first template, that is substantially perpendicular to the first side.

The length of a side of the second scanning region, that is substantially perpendicular to the predetermined direction, may be equal to the length of a side of the target image that is substantially perpendicular to the predetermined direction.

The first partial image may be detected by a single scanning along the first side while the second partial image is detected by a single scanning along the second side.

According to the second aspect of the present invention, a length measurement method for measuring a length of a part to be measured of an object having a band-like pattern extending along a predetermined direction, comprises: detecting a target image from an image of the object, the target image containing at least part of the band-like pattern, a relative position of the part to be measured with respect to a position of the target image being known; detecting the part to be measured based on the position of the target image; and measuring the length of the part to be measured. The detection of the target image comprises: storing at least a part of the image of the object as image data; detecting a first partial image from the stored image data based on a first template containing a first band-like template pattern that extends along the predetermined direction, the first partial image being an image of a first partial region containing substantially the same pattern as the first band-like template pattern; and detecting a second partial image, as the target image, in a region that extends from the first partial region along the predetermined direction based on the target image containing the at least part of the band-like pattern of the object, the second partial image being an image of a second partial region containing substantially the same pattern as that of the target image.

According to the third aspect of the present invention, a length measurement apparatus for measuring a length of a part of an object having a band-like pattern extending along a predetermined direction, comprises: an image data storing unit operable to store at least a part of an image of the object as image data; a first image detecting unit operable to detect a first partial image from the image data stored in the image data storing unit based on a template containing a band-like template pattern that extends along the predetermined direction, the first partial image being an image of a first partial region containing substantially the same pattern as the band-like template pattern; a second image detecting unit operable to detect a second partial image in a region that extends from the first partial region along the predetermined direction based on a further template containing a predetermined pattern, the second partial image being an image of a second partial region containing substantially the same pattern as the predetermined pattern of the further template; third image detecting unit operable to detect the part to be measured based on a position at which the second partial image is detected, a positional relationship between the part to be measured and the position being known; and a length measuring unit operable to detect the length of the part.

The summary of the invention does not necessarily describe all necessary features of the present invention. The present invention may also be a sub-combination of the features described above. The above and other features and advantages of the present invention will become more apparent from the following description of the embodiments taken in conjunction with the accompanying drawings.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 2:
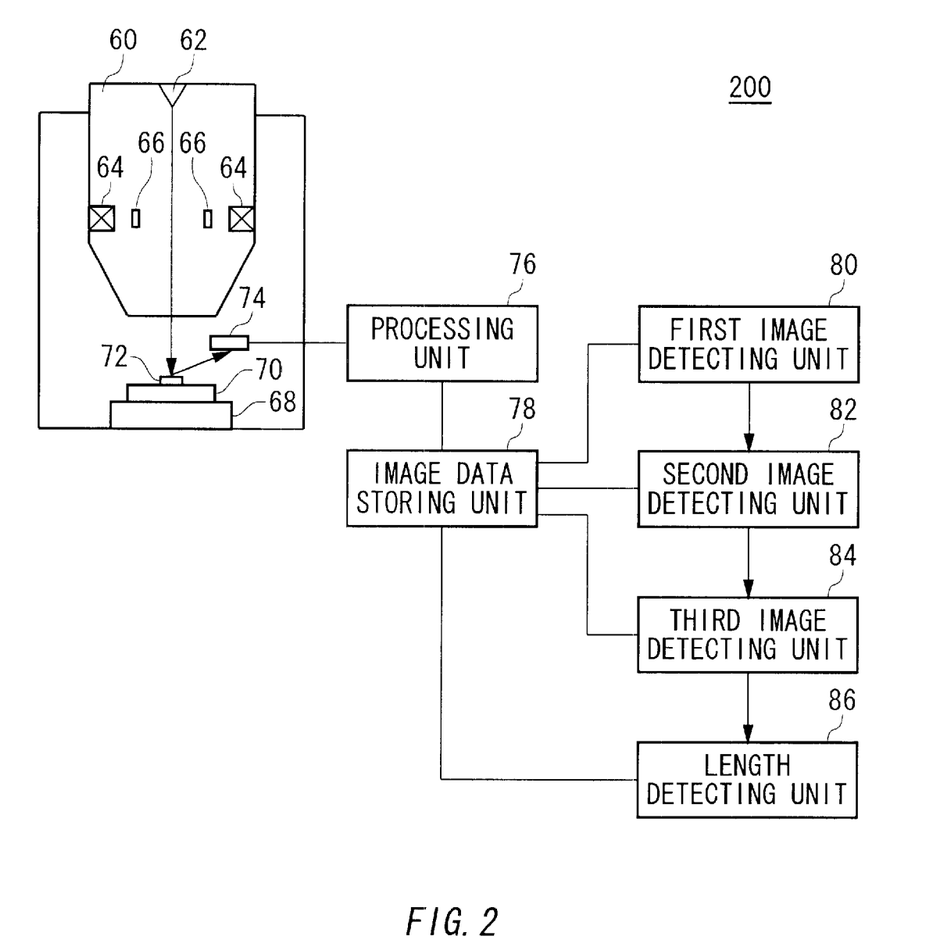
FIG. 2 schematically shows a length measurement apparatus according to an embodiment of the present invention.

FIG. 2 schematically shows a length measurement apparatus 200 according to an embodiment of the present invention. The length measurement apparatus 200 measures a length of a part 72 included in an object 70.

The length measurement apparatus 200 includes a body 60, a stage 68, a backscattered-electron detecting unit 74, a processing unit 76, an image data storing unit 78, a first image detecting unit 80, a second image detecting unit 82, a third image detecting unit 84,and a length detecting unit 86.

The body 60 accommodates an electron gun 62, an electron lens 64 and a deflector 66. The electron gun 62 emits an electron beam toward the object 70. Backscattered electrons from the object 70 are detected by the backscattered electron detecting unit 74. The electron lens 64 adjusts a focal point of the electron beam emitted from the electron gun 62. The deflector 66 adjusts a traveling direction of the electron beam emitted from the electron gun 62, thereby adjusting a position on the object onto which the electron beam is incident. The stage 68 adjusts a position at which the object 70 is located. By controlling the deflector 66 or the stage 68, the electron beam is directed to a predetermined region of the object.

The backscattered electron detecting unit 74 sends the processing unit 76 an electric signal in accordance with the intensity or the like of the backscattered electrons at each position in the predetermined region of the object 70. The processing unit 76 converts the electric signal from the backscattered electron detecting unit 74 into image data and stores the image data in the image data storing unit 78.

The first image detecting unit 80 detects a first partial image containing substantially the same pattern as the first template pattern from the image data stored in the image data storing unit 78 by using the first template containing the first template pattern that is a band-like pattern.

The second image detecting unit 82-detects, by using another template containing a predetermined partial image, the second partial image containing substantially the same pattern as the predetermined partial image in a region that extends from a region corresponding to the first partial image detected by the first image detecting unit 82 along a direction along which the first template pattern extends.

The third image detecting unit 84 detects the part 72 included in the object 70 based on a position at which the second partial image is detected. The length detecting unit 86 detects the length of the detected part 72 of the object 70.

Figure 3A:
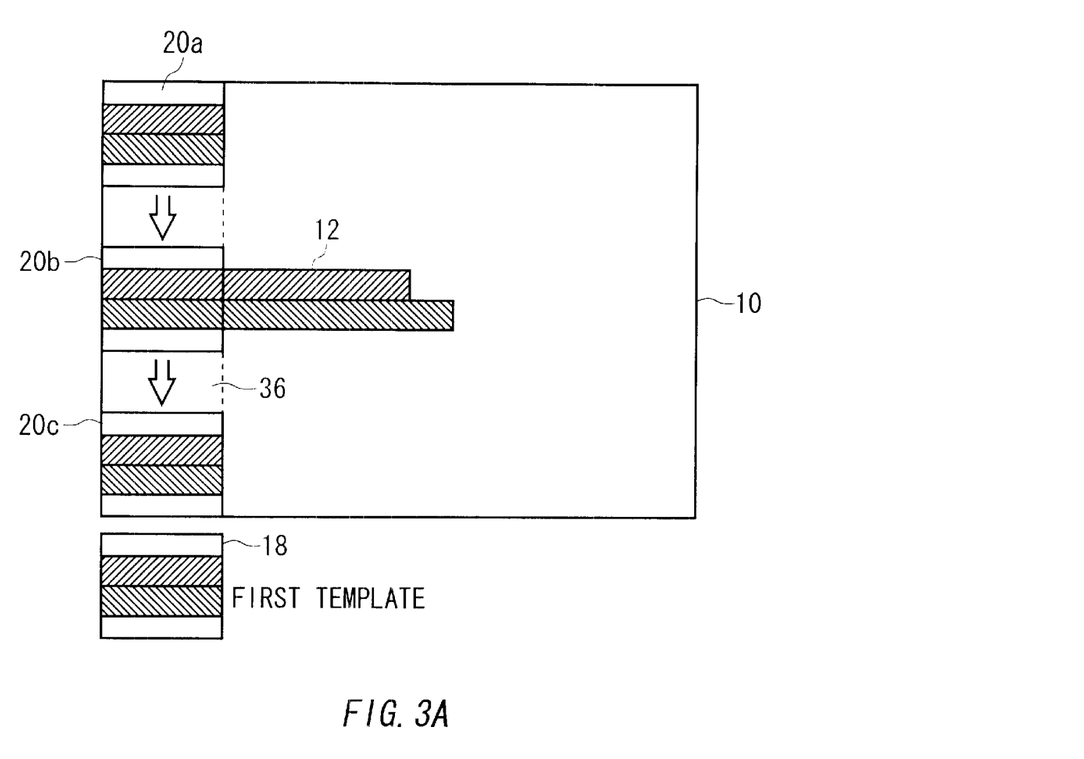
FIGS. 3A and 3B illustrate image detection processes by the first and second image detecting units of the length measurement apparatus.
Figure 3B:
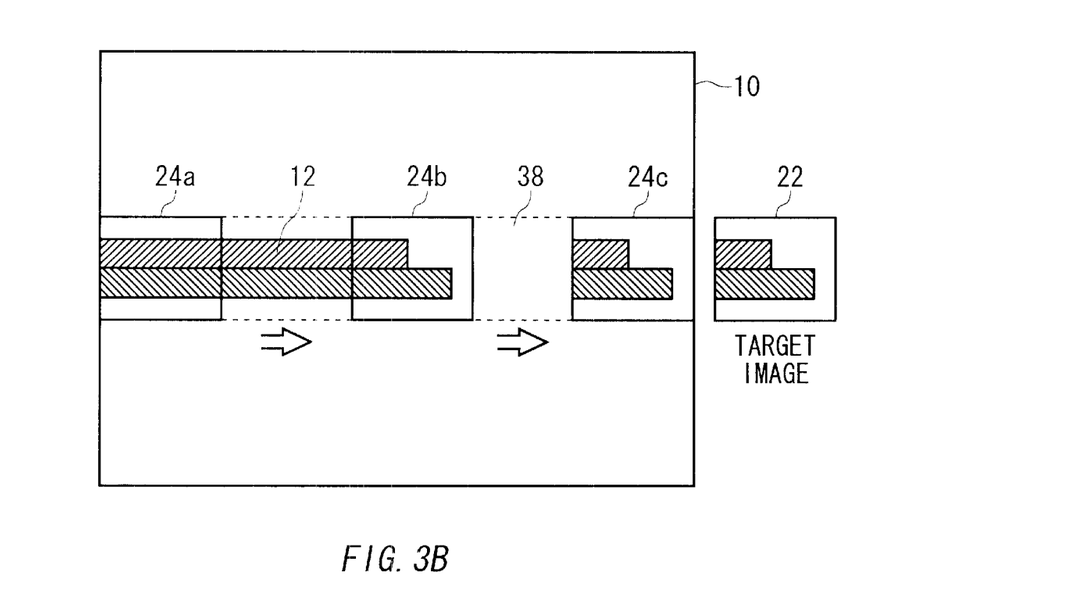

FIGS. 3A and 3B illustrate exemplary image detection processes respectively performed by the first and second image detecting units 80 and 82 (see FIG. 2). By the image detection processes, a partial image containing substantially the same pattern as a pattern contained in a target image 22 is detected from image data 10 of the object 70 (see FIG. 2).

FIG. 3A illustrates the image detection process performed by the first image detecting unit 80. The image data storing unit 78 (see FIG. 2) stores the image data 10. The first image detecting unit 80 uses the first template 18 containing the first band-like template pattern so as to detect the first partial image containing substantially the same pattern as the first band-like template pattern.

In the example shown in FIG. 3A, a band-like pattern 12 of the object including the pattern of the detected first partial image reaches an end of a region for which the image data 10 is stored. In this case, it is preferable to detect the first partial image in the first scanning region 36 along at least a part of one side of the region for which the image data 10 is stored, the first scanning region 36 including the end of the image data 10 the band-like pattern 12 reaches. In the first scanning region 36, the first partial image that contains substantially the same pattern as that of the first template 18 is detected by scanning the first scanning region 36 from a position 20a, for example, in the first direction shown with an arrow in FIG. 3A. The first direction is substantially parallel to the side of the region corresponding to the image data 10 that includes the end the band-like pattern 12 reaches. It is preferable that the length of a side of the first scanning region 36 that is substantially perpendicular to the first direction is the same as that of the side of the first template 18 that is substantially perpendicular to the first direction. Moreover, it is preferable to detect the first partial image in the first scanning region 36 by one scanning from the position 20a to a position 20c as shown with the arrow in FIG. 3A. As a result of the scanning of the first scanning region 36, the first partial image containing substantially the same pattern as the first band-like template pattern of the first template 18 is detected at a position 20b in the example shown in FIG. 3A.

FIG. 3B illustrates the image detection process performed by the second image detecting unit 82. The second image detecting unit 82 detects the second partial image containing substantially the same pattern as that contained in the target image 22 by using the target image 22 containing the second template pattern as the template, in the second scanning region that extends from the region of the first partial image detected in the first scanning region 36 along the extending direction of the pattern of the first partial image extends, that is, the direction along which the band-like pattern 12 of the object extends as shown with an arrow in FIG. 3B. In the example shown in FIG. 3B, the detection of the second partial image is performed in the second scanning region 38.

It is preferable that the first scanning region 36 and the second scanning region 38 are substantially perpendicular to each other. Moreover, it is preferable that the length of the side of the second scanning region 38, that is substantially perpendicular to the second direction shown with the arrow in FIG. 3B, is equal to the length of the side of the target image 22, that is substantially perpendicular to the second direction. Furthermore, it is preferable to detect the second partial image by one scanning of the second scanning region 38 from a position 24a to a position 24c. As a result of the scanning of the second scanning region 38, the second partial image containing substantially the same pattern as the second template pattern contained in the target image 22 is detected at the position 24b in the example of FIG. 3B, thereby the target image 22 is detected.

Figure 4A:
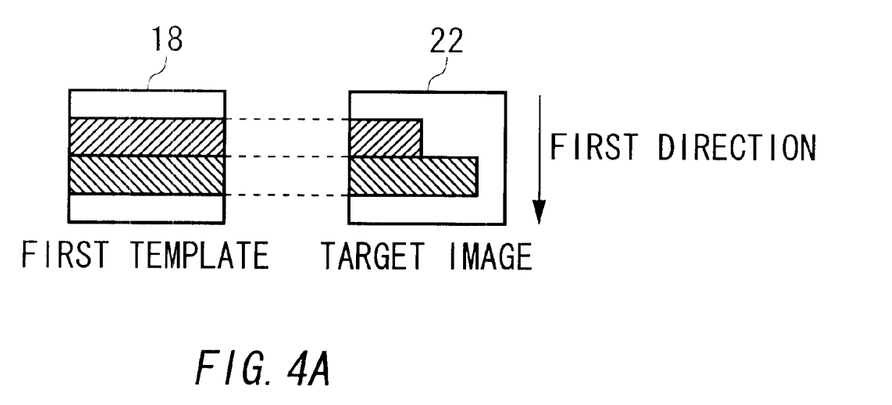
FIGS. 4A and 4B show examples of the first template and a target image used in the image detection processes by the first and second image detecting units.
Figure 4B:
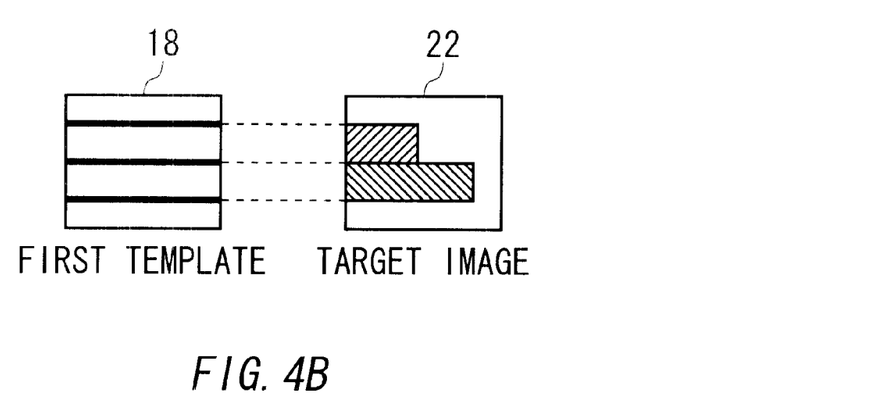

FIGS. 4A and 4B show examples of the first template 18 containing the first template pattern and the target image 22 containing the second template pattern. The target image 22 serves as the template for the detection of the second partial image. As shown in FIG. 4A, the first band-like template pattern includes a stripe pattern, i.e., a band-like pattern extending along the extending direction of the band-like pattern 12 (see FIGS. 3A and 3B) of the object, at least a part of the band-like pattern 12 being a pattern contained in the target image 22. As shown by dotted line in FIG. 4A, the length of the first band-like template pattern of the first template 18 is substantially equal to that of the second band-like template pattern of the target image 22. Alternatively, a template image in which outline of the first template pattern is highlighted may be used as the first template 18. By highlighting the outline, a recognition ratio in the detection of the first partial image can be improved.

Figure 5:
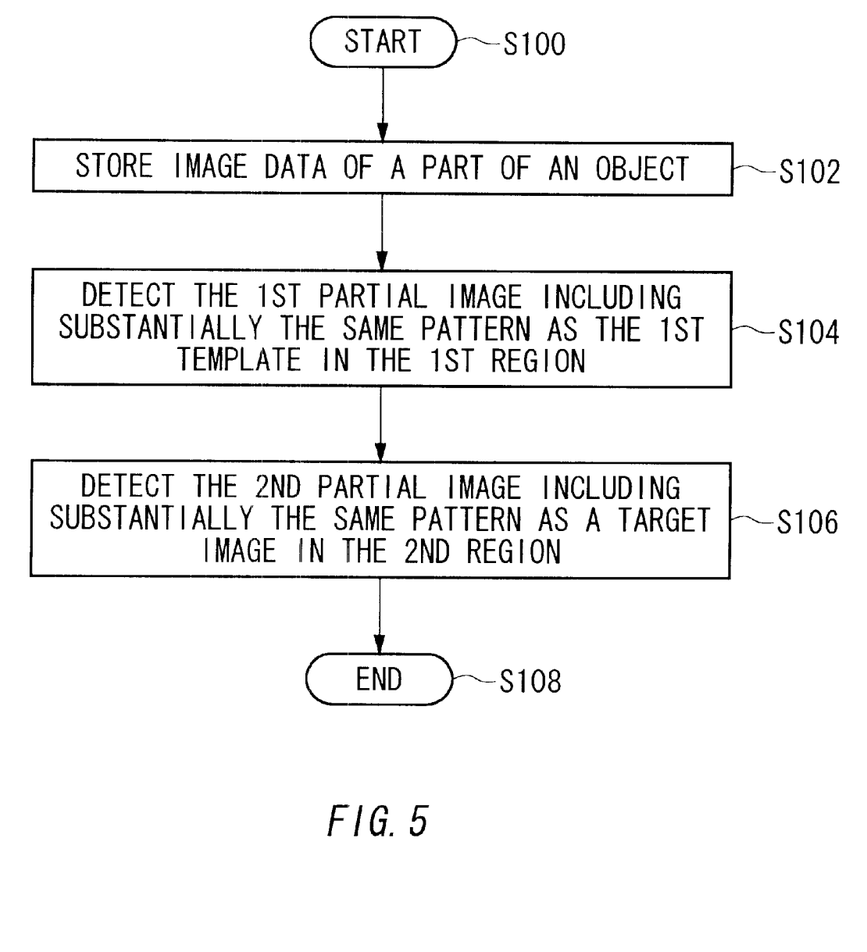
FIG. 5 is a flowchart of an image detection method including the image detection processes by the first and second image detecting units according to the embodiment of the present invention.

FIG. 5 is a flowchart of an image detection method according to the embodiment of the present invention. The image detection method includes an image data storing step (Step S102), the first partial image detection step (Step S104) performed by the first image detecting unit 80 and the second partial image detection step performed by the second image detecting unit 82 (Step S106)

The image detection is started in Step S100, image data of a region of an object is stored in the image data storing step (Step S102). The region may contain the object entirely or partially, as long as the region includes at least a part of a band-like pattern of the object. Then, in the first partial image detection step (Step S104), a first partial image containing substantially the same pattern as that contained in the first template is detected in the first scanning region. In the first partial image detection step (Step S104), the first partial image may be detected in accordance with the method described referring to FIG. 3A. Next, in the second partial image detection step (Step S106), the second partial image containing substantially the same pattern as that of a target image serving as the template is detected in the second scanning region crossing the first region substantially at right angles. In the second partial image detection step (Step S106), the second partial image may be detected in accordance with the method described referring to FIG. 3B. When the second partial image has been detected, the image detection is finished (Step S108).

Figure 6A:
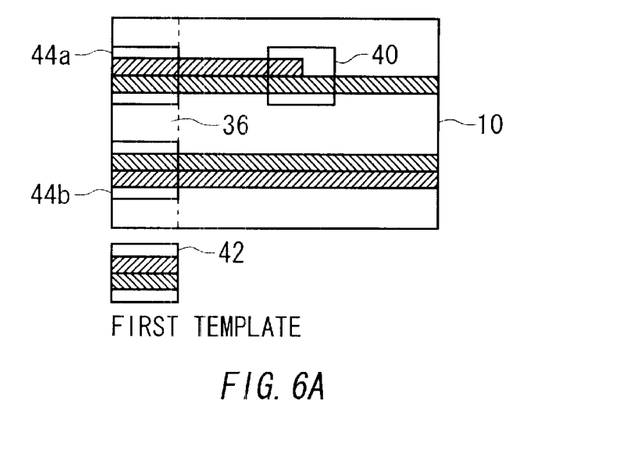
FIGS. 6A, 6B and 6C illustrate other examples of the image detection processes by the first and second image detecting units.
Figure 6B:
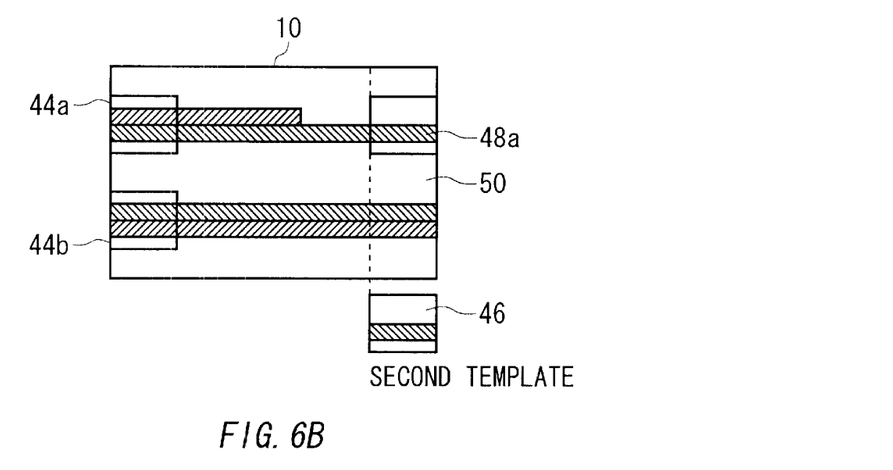
Figure 6C:
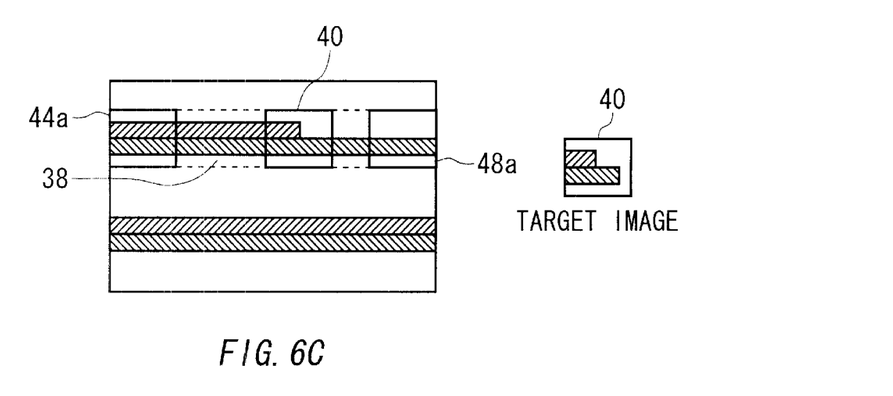

FIGS. 6A, 6B and 6C illustrate image detection in a case where a plurality of first partial images each of which contains substantially the same pattern as that of the first-template in the first scanning region 36 in the first partial image detection step (Step S104 in FIG. 5). As an example, a case is described where the pattern substantially the same as the first template pattern of the first template 42 is detected at two positions, i.e., a position 44a and a position 44b in the first scanning region 36, as shown in FIG. 6A.

In the case where a plurality of first partial images are detected in the first scanning region 36, another band-like partial image that contains substantially the same pattern as the third pattern contained in the second template 46 is detected in the third scanning region 50 substantially parallel to the first scanning region 36, as shown in FIG. 6B. In this example, as a result of scanning of the third scanning region 50, the other band-like partial image containing substantially the same pattern as that of the second template 46 is detected at a position 48a. Then, as shown in FIG. 6C, a partial image containing substantially the same pattern as that of a target image 40 is detected in the second scanning region 38 that includes both the positions 44a and 48a.

Furthermore, if a plurality of other band-like partial images are detected in the third scanning region 50, the second scanning region 38, for which the detection of the partial image that contains substantially the same as that of the target image is performed, may be determined by detecting still another band-like partial image in a scanning region different from the first and third scanning regions that is substantially parallel to the first scanning region.

According to the image detection method described above, the partial image that contains substantially the same pattern as that of the target image not by entirely scanning the image data, but by scanning a limited region of the image data. Thus, a time period required for detecting the partial image can be reduced.

Figure 7:
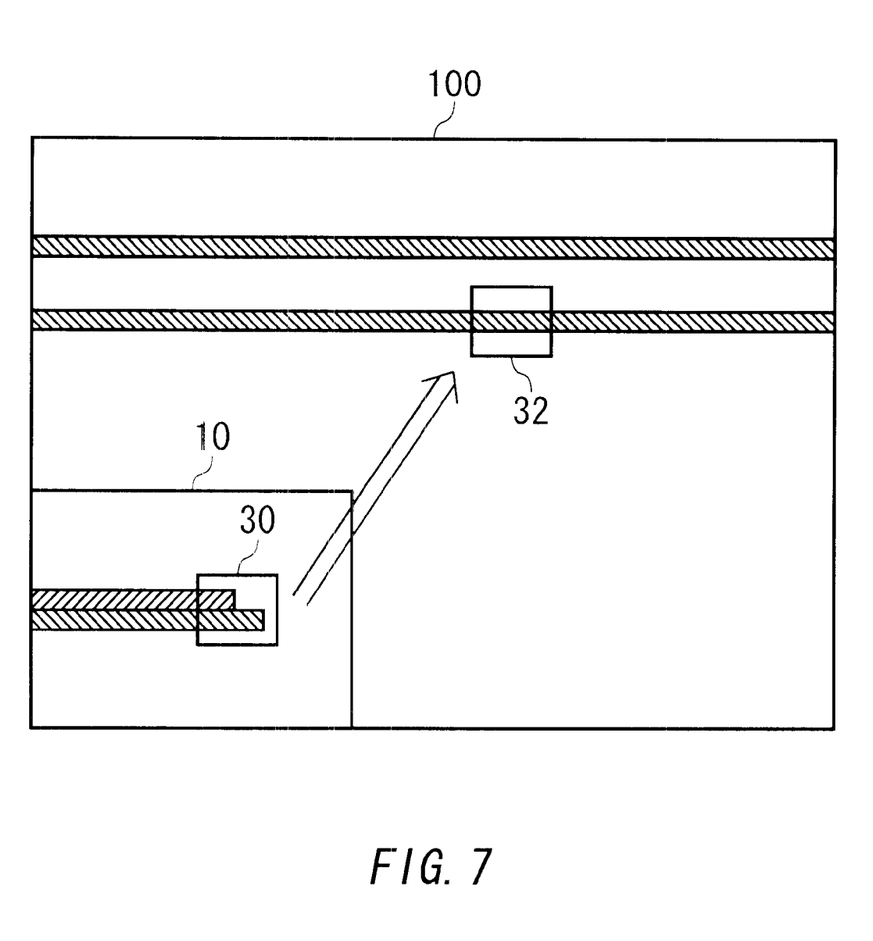
FIG. 7 illustrates an image detection process performed by the third image detecting unit of the length measurement apparatus.

FIG. 7 illustrates an exemplary image detection process performed by the third image detecting unit 84 of the length measurement apparatus 200. The third image detecting unit 84 detects a partial image 32 containing the part 72 for which the length is to be measured based on a positional relationship between the partial image 32 and a partial image 30 included in the image data 10 of the object 70.

The partial image 30 is detected from the image data 10 by the image detection method described referring to FIGS. 3A to 6C. In this example, if a relative position of the partial image 32 included in image data 100 that corresponds to a broader region than that of the image data 10 with respect to the position of the partial image 30 is known, the partial image 32 can be detected easily by detecting the partial image 30. Even if the image data 100 includes a partial image that contains a pattern the same as or similar to that of the partial, image 32, the partial image 32 can be detected easily according to the image detection method of the present embodiment. Although the partial image 32 is not contained in the image data 10 in the example shown in FIG. 7, the partial image 32 may be contained in the image data 10. Moreover, the image data 100 may contain the image data 10. In an alternative example, the image data 10 and the image data 100 may be regions independently of each other or regions partially overlapping each other. Furthermore, the image data 10 may be broader than the image data 100.

By means of the length measurement apparatus as described above, the part 72 to be measured can be detected easily, thereby enabling a time period required for the length measurement to be reduced.

The image detection method according to the above embodiment of the present invention is effective especially in a case where arrangements of respective members and/or respective elements forming a semiconductor device are determined in accordance with design and therefore positional relationships between the respective members or elements are known, for example, in a case of a magnetic head device or a semiconductor circuit device.

In the above embodiment, the image detection method of the present invention is applied to the length measurement apparatus 200. However, it is apparent from the above description that the image detection method of the present invention can also be applied to an apparatus other than the length measurement apparatus 200, for example, an electron beam exposure apparatus or a test apparatus using an electron beam.

As is apparent from the above description, according to the present invention, a target image can be detected from an object in a shortened time period. In addition, since the target image can be detected in the shortened time period, a time period required for measuring the length of a part of the object can be reduced.

Although the present invention has been described by way of exemplary embodiments, it should be understood that those skilled in the art might make many changes and substitutions without departing from the spirit and the scope of the present invention which is defined only by the appended claims.

What is claimed is:

1. An image detection method for detecting a target image from an image of an object having a band-like pattern extending along a predetermined direction, said target image containing at least part of said band-like pattern, said method comprising:

storing at least part of said image of said object as image data;

detecting a first partial image from said stored image data based on a first template containing a first band-like template pattern that extends along said predetermined direction, said first partial image being an image of a first partial region containing substantially the same pattern as said first band-like template pattern; and detecting a second partial image, as said target image, in a region that extends from said first partial region along said predetermined direction based on said target image containing said at least part of said band-like pattern of said object, said second partial image being an image of a second partial region containing substantially the same pattern as that contained in said target image.

2. An image detection method as claimed in claim 1, wherein a region for which said image data is stored has at least first and second sides crossing each other, said second side being substantially parallel to said predetermined direction, said detection of said first partial image is performed by scanning a first scanning region that is a part of said region for which said image data is stored, along said first side, and said detection of said second partial image is performed by scanning, along said second side, a second scanning region that extends from said first partial region along said predetermined direction.

3. An image detection method as claimed in claim 2, wherein said first and second scanning regions cross substantially at right angles.

4. An image detection method as claimed in claim 2, wherein said band-like pattern of said object reaches an end of said region for which said image data is stored, said end including said first side, and said first scanning region for which said scanning for said detection of said first partial image is performed includes said end.

5. An image detection method as claimed in claim 4, wherein a length of said first band-like template pattern in a direction along said first side is substantially equal to a length of said pattern contained in said target image in said direction along said first side.

6. An image detection method as claimed in claim 5, wherein a length of a side of said first scanning region, that is substantially perpendicular to said first side, is equal to a length of a side of said first template, that is substantially perpendicular to said first side.

7. An image detection method as claimed in claim 6, wherein a length of a side of said second scanning region, that is substantially perpendicular to said predetermined direction is equal to a length of a side of said target image that is substantially perpendicular to said predetermined direction.

8. An image detection method as claimed in claim 2, wherein said first partial image is detected by a single scanning along said first side while said second partial image is detected by a single scanning along said second side.

9. A length measurement method for measuring a length of a part to be measured of an object having a band-like pattern extending along a predetermined direction, comprising:

detecting a target image from an image of said object, said target image containing at least part of said band-like pattern, a relative position of said part to be measured with respect to a position of said target image being known;

detecting said part to be measured based on said position of said target image; and measuring said length of said: part to be measured, wherein said detection of said target image comprises:

storing at least a part of said image of said object as image data;

detecting a first partial image from said stored image data based on a first template containing a first band-like template pattern that extends along said predetermined direction, said first partial image being an image of a first partial region containing substantially the same pattern as said first band-like template pattern; and detecting a second partial image, as said target image, in a region that extends from said first partial region along said predetermined direction based on said target image containing said at least part of said band-like pattern of said object, said second partial image being an image of a second partial region containing substantially the same pattern as that of said target image.

10. A length measurement apparatus for measuring a length of a part of an object having a band-like pattern extending along a predetermined direction, comprising:

an image data storing unit operable to store at least a part of an image of said object as image data;

a first image detecting unit operable to detect a first partial image from said image data stored in said image data storing unit based on a template containing a band-like template pattern that extends along said predetermined direction, said first partial image being an image of a first partial region containing substantially the same pattern as said band-like template pattern;

a second image detecting unit operable to detect a second partial image in a region that extends from said first partial region along said predetermined direction based on a further template containing a predetermined pattern, said second partial image being an image of a second partial region containing substantially the same pattern as said predetermined pattern of said further template;

a third image detecting unit operable to detect said part to be measured based on a position at which said second partial image is detected, a positional relationship between said part to be measured and said position being known; and a length measuring unit operable to detect said length of said part.

* * * * *